United States Patent
Nakashima et al.

(10) Patent No.: US 9,768,424 B2
(45) Date of Patent: Sep. 19, 2017

(54) BATTERY PACK

(71) Applicant: NEC ENERGY DEVICES, LTD., Sagamihara-shi, Kanagawa (JP)

(72) Inventors: Satoshi Nakashima, Kanagawa (JP); Makoto Unno, Kanagawa (JP)

(73) Assignee: NEC ENERGY DEVICES, LTD., Kanagawa (JP)

( * ) Notice: Subject to any disclaimer, the term of this patent is extended or adjusted under 35 U.S.C. 154(b) by 0 days.

(21) Appl. No.: 14/771,549

(22) PCT Filed: Oct. 28, 2013

(86) PCT No.: PCT/JP2013/079110
§ 371 (c)(1),
(2) Date: Aug. 31, 2015

(87) PCT Pub. No.: WO2014/141525
PCT Pub. Date: Sep. 18, 2014

(65) Prior Publication Data
US 2016/0020442 A1 Jan. 21, 2016

(30) Foreign Application Priority Data
Mar. 15, 2013 (JP) .................... 2013-053389

(51) Int. Cl.
*H01M 2/10* (2006.01)
*H01M 10/0525* (2010.01)
*H01M 2/02* (2006.01)

(52) U.S. Cl.
CPC ....... *H01M 2/1016* (2013.01); *H01M 2/0212* (2013.01); *H01M 2/1077* (2013.01);
(Continued)

(58) Field of Classification Search
CPC ........... H01M 2/1077; H01M 10/0525; H01M 2/1094; H01M 2/1016
See application file for complete search history.

(56) References Cited

U.S. PATENT DOCUMENTS

2001/0005561 A1* 6/2001 Yamada ............ H01M 2/1066
429/152
2008/0187820 A1* 8/2008 Nakano .................. H01G 2/08
429/83
(Continued)

FOREIGN PATENT DOCUMENTS

CN 102272981 A 12/2011
CN 102959654 A 3/2013
(Continued)

OTHER PUBLICATIONS

International Search Report for PCT/JP2013/079110 dated Dec. 24, 2013 [PCT/ISA/210].
(Continued)

*Primary Examiner* — Muhammad Siddiquee
(74) *Attorney, Agent, or Firm* — Sughrue Mion, PLLC

(57) ABSTRACT

The object of the present invention is to provide a battery pack that can reduce the thickness of the entire battery while ensuring that the film-packaged batteries adhere to each other. The battery pack of the present invention includes: film-packaged battery assembly 12 of multiple laminated film-packaged batteries 12, each film-packaged battery including power generation element 11 and film-wrapping 12 forming an interior space 13 that can house power generation element 11 along with electrolyte; and, at least one fixing member 3 that faces the side face of film-packaged battery assembly 2. Film wrapping 12 includes casing part 14 that forms interior space 13 and sealing part 15 that extends from casing part 14 to fixing member 3 to seal interior space 13. Sealing part 15 is inserted in slit 4 that is formed in fixing member 3 and that is fixed therein to fixing member 3.

9 Claims, 4 Drawing Sheets

(52) U.S. Cl.
CPC ..... *H01M 2/1094* (2013.01); *H01M 10/0525* (2013.01); *Y02T 10/7011* (2013.01)

(56) References Cited

U.S. PATENT DOCUMENTS

2011/0171505 A1\*  7/2011  Kishll ................. H01M 2/1016
                                                        429/82
2013/0083453 A1\*  4/2013  Kobayashi ............... H01G 2/04
                                                        361/502

FOREIGN PATENT DOCUMENTS

| | | |
|---|---|---|
| JP | 2001-256942 A | 9/2001 |
| JP | 2004-047262 A | 2/2004 |
| JP | 2006-172882 A | 6/2006 |
| JP | 2007-042453 A | 2/2007 |
| JP | 2012-015365 A | 1/2012 |
| JP | 2012-138315 A | 7/2012 |
| JP | 2012-199255 A | 10/2012 |
| JP | 2013-051121 A | 3/2013 |
| WO | 2006/038697 A1 | 4/2006 |

OTHER PUBLICATIONS

Communication dated Dec. 23, 2016 from the State Intellectual Property Office of the P.R.C. in counterpart Application No. 201380074746.0.

\* cited by examiner

BATTERY PACK

CROSS REFERENCE TO RELATED APPLICATIONS

This application is a National Stage of International Application No. PCT/JP2013/079110 filed Oct. 28, 2013, claiming priority based on Japanese Patent Application No. 2013-053389 filed Mar. 15, 2013, the contents of all of which are incorporated herein by reference in their entirety.

TECHNICAL FIELD

The present invention relates to a battery pack formed of a plurality of film-packaged batteries provided in layers each of which are held together by film wrapping and include a power generation element along with electrolyte.

BACKGROUND ART

Recently, secondary batteries typified by lithium-ion batteries have been installed not only in portable devices such as mobile phones, and digital cameras, but also in electric bicycles, electric motor cycles and cars. Due to the various ways in which secondary batteries are used, battery weight reduction and increase design freedom have become current requirements. Film-packaged batteries that use a lightweight, easy to flexible film wrapping material have emerged as secondary batteries that can satisfy this demand. Further, for use requiring high power, battery packs that include a plurality of film-packaged batteries that are arranged in alternate layers are known.

In a battery pack, the occurrence of interlayer deviation among the film-packaged batteries increases the likelihood that the film-packaged battery will be damaged due to falling and impacts. Therefore, in a battery pack, it is preferable that film-packaged batteries are affixed to each other so as to prevent the occurrence of interlayer deviation. Patent Document 1 discloses a technique for affixing film-packaged batteries.

FIG. 1 is a perspective view showing a battery pack disclosed in Patent Document 1. In battery pack 100 shown in FIG. 1, the film-packaged batteries are each held in cell case 101. Cell case 101 is formed with conduits 102. Rod 103 is inserted into conduit 102. A nut is engaged at end 104 of rod 103. In this way, a plurality of cell cases 101 are fixed to rods 103, whereby the film-packaged batteries that are held in cell cases 101 are fixed to each other.

RELATED ART DOCUMENTS

Patent Documents

Patent Document 1: Japanese Patent Laid-Open 2006-172882

SUMMARY

Problems to be Solved by the Invention

Since in the above-described battery pack 100 the film-packaged batteries are held in cell cases 101, the thickness of cell cases 101 is added to the thickness of battery pack 10. As a result, as the number of cell cases 101 increases, the thickness of battery pack 10 markedly increases, which causes an increase in the size of the battery.

It is therefore an object of the present invention to provide a battery pack whose overall thickness is reduced while ensuring that the film-packaged batteries adhere to each other.

Means for Solving the Problems

In order to attain the above object, An exemplary aspect of the battery pack of the present invention includes: a film-packaged battery assembly of a plurality of laminated film-packaged batteries, each laminated film-packaged battery including a power generation element in which cathodes and anodes are laminated alternately with separators interposed therebetween and an internal space that is formed for housing the power generation element along with an electrolyte; and, at least one fixing member that faces the side face of the film-packaged battery assembly. The film wrapping material includes a casing part that forms the interior space and a sealing part that extends from the casing part to the fixing member to seal the interior space. The sealing part is inserted in a slit that is formed in the fixing member and that is fixed therein to the fixing member.

Effect of the Invention

According to the present invention, it is possible to reduce the thickness of the entire battery while ensuring that the film-packaged batteries adhere to each other.

EXEMPLARY EMBODIMENT

Exemplary Embodiment 1

Figure 1:
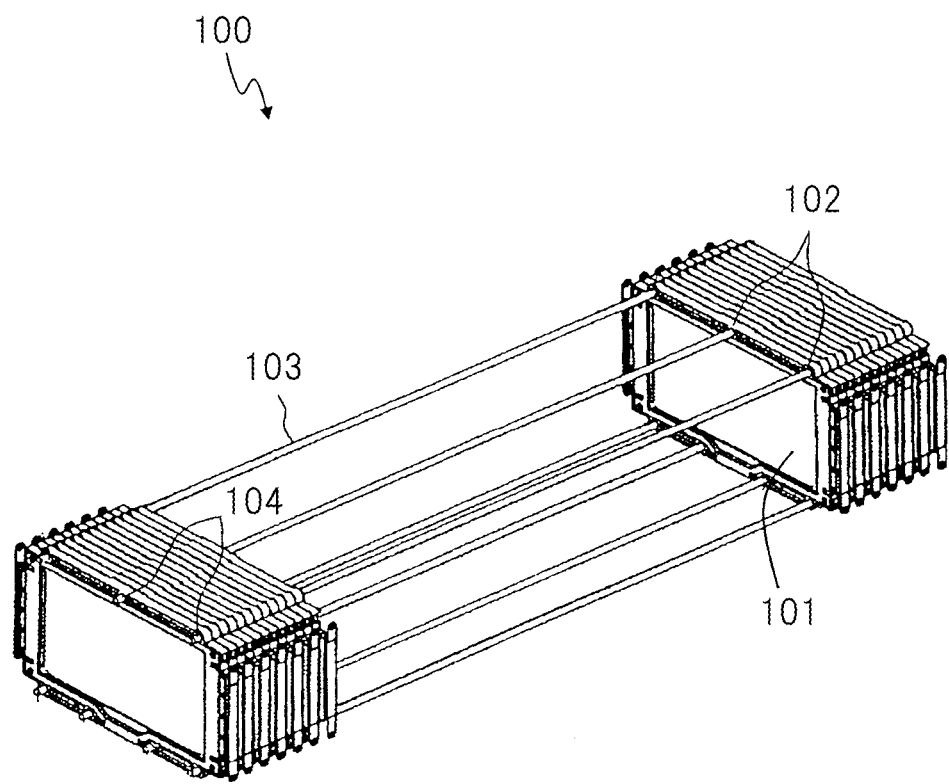
FIG. 1 is a perspective view of a battery pack disclosed in Patent Document 1.
Figure 2:
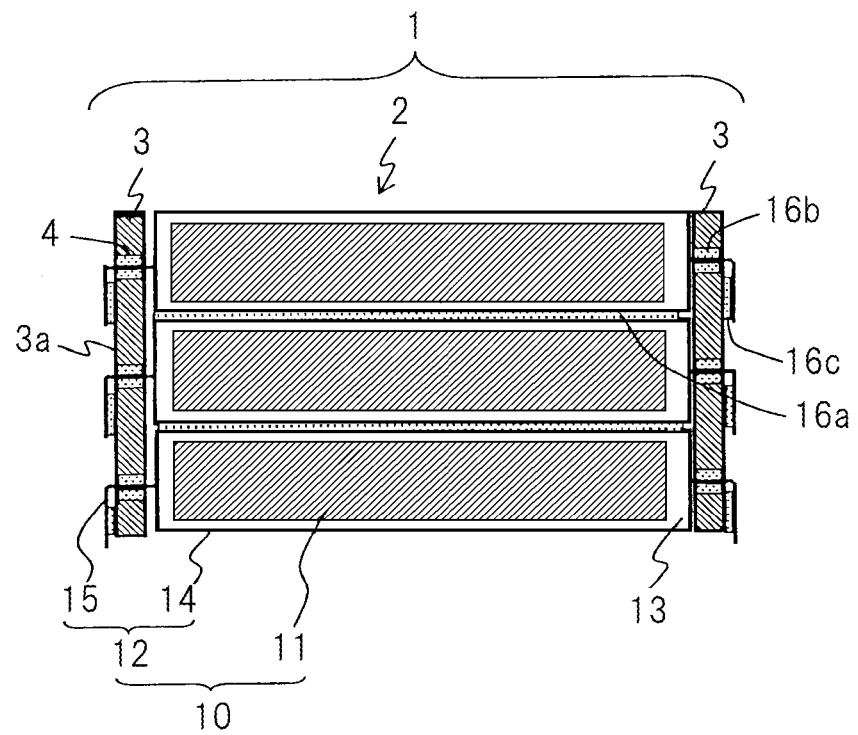
FIG. 2 is a sectional view showing the structure of a battery pack of exemplary embodiment 1.

FIG. 2 is a sectional view showing the structure of a battery pack of exemplary embodiment 1. As shown in FIG. 2, battery pack 1 includes film-packaged battery assembly 2 and fixing members 3. The film-packaged battery assembly 2 is formed of a plurality of film-packaged batteries 10. The multiple film-packaged batteries 10 are layered and are bonded with bonding component 16a. Fixing members 3 are arranged in the width direction perpendicular to the direction of lamination, facing film-packaged battery assembly 2.

Figure 3:
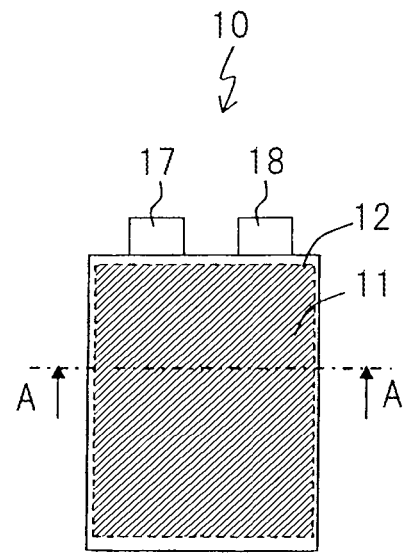
FIG. 3 is a plan view showing the structure of the film-packaged battery shown in FIG. 2.
Figure 4:
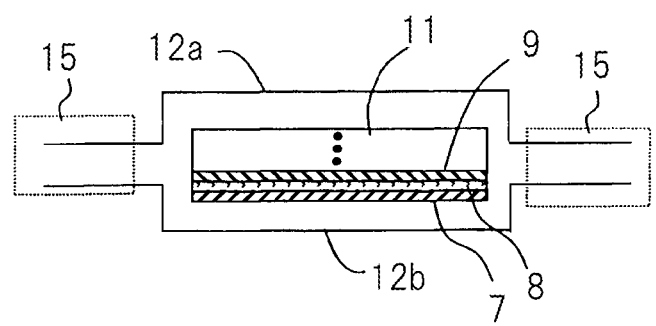
FIG. 4 is a decomposed view of the film-packaged batteries shown in FIG. 3.

FIG. 3 is a plan view showing the structure of film-packaged battery 10 shown in FIG. 2. FIG. 4 is a decomposed view of the film-packaged battery shown in FIG. 3. FIG. 4 corresponds to the sectional view cut along sectioning line A-A shown in FIG. 3.

As shown in FIGS. 2 to 4, each film-packaged battery 10 include a chargeable and dischargeable power generation element 11 and film wrapping 12 that holds power generation element 11. Power generation element 11 is formed of cathodes 7 and anodes 9 laminated alternately with separators 8 in-between (see FIG. 4). Cathode lead terminal 17 (see FIG. 3) is connected to cathode 7. Anode lead terminal 18 (see FIG. 3) is connected to anode lead terminal 18. Cathode lead terminal 17 and anode lead terminal 18 may be projected from power generation element 11 both in the same direction as shown in FIG. 3, or may be projected from power generation element 11 in opposite directions.

Film wrapping 12 includes casing part 14 and sealing part 15 (see FIG. 2). Casing part 14 forms interior space 13 that can hold an electrolyte together with power generation element 11. Sealing part 15 seals interior space 13. As shown in FIG. 4, in the present exemplary embodiment, film wrapping 12 is composed of two film sheets 12a and 12b. In the present exemplary embodiment, film sheets 12a and 12b are each formed with a depressed portion that functions as casing part 14. In the present invention, film wrapping 12 may be provided in the form of one film sheet folded in half.

Figure 5:
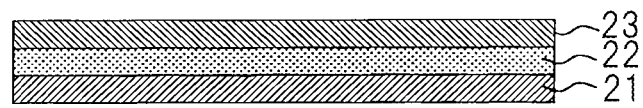
FIG. 5 is a diagram showing the sectional structure of a film material.

FIG. 5 is a diagram showing the sectional structure of the film sheet. As shown in FIG. 5, film sheets 12a and 12b are each a laminate that includes resin layer 21, metal layer 22 and resin layer 23. Resin layer 21 is composed of a thermo fusing synthetic resin such as polyethylene, polypropylene or the like. Laminated on resin layer 21 is metal layer 22. Metal layer 22 is composed of a metal foil such as of aluminum, SUS(Steel Use Stainless) or the like. Laminated on metal layer 22 is resin layer 23. Resin layer 23 is composed of a weather-resistant resin such as polyamide, polyethylene terephthalate, nylon, or the like. The peripheral parts of resin layer 21 of each film sheet are thermally fused so as to seal interior space 13. This thermally fused area forms sealing part 15. Sealing part 15 is bonded to fixing member 3 as shown in FIG. 2.

Figure 6:
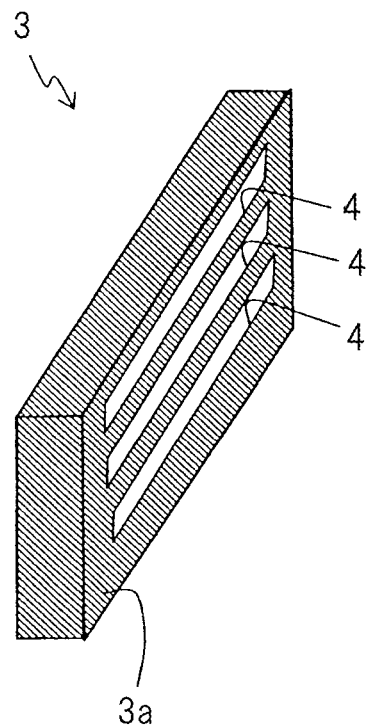
FIG. 6 is a perspective view of a fixing member.

FIG. 6 is a perspective view showing fixing member 3. Fixing member 3 faces the side face (the side adjacent to the laminated side of film wrapping 12) of film-packaged battery assembly 2. The material of fixing member 3 is preferably one that can be easily worked, such as polyurethane resin, urethane rubber, polycarbonate, ABS (Acrylonitrile Butadiene Styrene) resin, and that can mitigate the force of impacts. Fixing member 3 is formed with a plurality of slits 4 arrayed in the laminated direction of power generation elements 11. Slit 4 is perforated through fixing member 3 in the width direction that is perpendicular to the laminated direction. Arranged in the interior of each slit 4 is bonding component 16b (see FIG. 2). Bonding component 16b has sealing part 15 of film wrapping 12 bonded to the interior of each slit 4. Further, in the present exemplary embodiment, the projected portion of sealing part 15 beyond slit 4 is bent and bonded to outer side 3a of fixing member 4 with bonding component 16c (see FIG. 2). Outer side 3a is the side where the openings of slits 4 are formed. Double-side tape, adhesives and others may be used for bonding components 16a, 16b and 16c. In the present invention, sealing part 15 may be bonded to fixing member 3 with bonding component 16b alone. Sealing part 15 may be bonded to fixing member 3 with bonding component 16c alone.

As described above, in battery pack 1 of this exemplary embodiment, sealing part 15 of each film-packaged battery 10 is bonded to fixing member 3 so as to fix the film-packaged batteries to each other. Since fixing member 3 is arranged on the side of film-packaged battery assembly 2, the thickness of fixing member 3 will not be added to the thickness of film-packaged battery assembly 2. As a result, it is possible to reduce the thickness of the entire battery while ensuring that the film-packaged batteries adhere to each other.

Exemplary Embodiment 2

Figure 7:
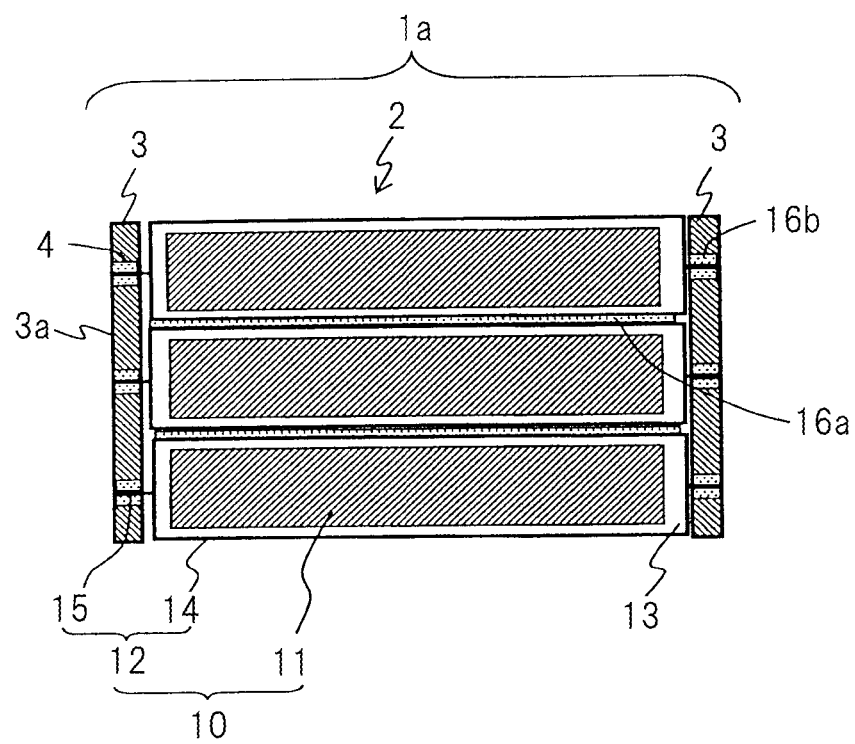
FIG. 7 is a sectional view showing the structure of a battery pack of exemplary embodiment 2.

Exemplary embodiment 2 of the present invention will be described. Description herein will be focused on the difference from exemplary embodiment 1. FIG. 7 is a sectional view that shows the structure of a battery pack of exemplary embodiment 2. The same components as those of battery pack 1 of exemplary embodiment 1 are allotted the same reference numerals, and a detailed description is omitted.

As shown in FIG. 7, in battery pack 1a of this exemplary embodiment, the width of fixing member 3 is specified to be equal to or greater than the length of sealing part 15, so that sealing part 15 terminates within the interior of slit 4. As a result, it becomes unlikely that sealing part 15 will be damaged by the force of impacts such as falling and other such occurrence. Further, sealing part 15 is not projected from slit 4, so that it is no longer necessary to bend sealing part 15.

Exemplary Embodiment 3

Figure 8:
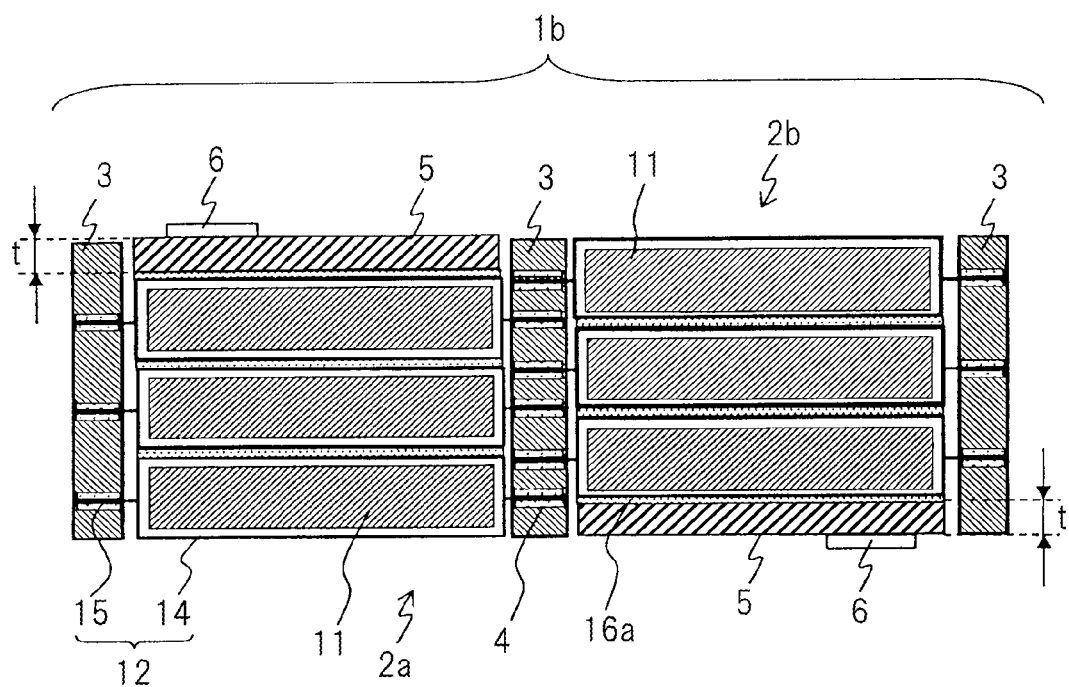
FIG. 8 is a sectional view showing the structure of a battery pack of exemplary embodiment 3.

Exemplary embodiment 3 of the present invention will be described. Description herein will be focused on the difference from exemplary embodiments 1 and 2. FIG. 8 is a sectional view showing the structure of a battery pack of exemplary embodiment 3. The same components as those of the above-described battery packs 1 and 1a are allotted the same reference numerals, and a detailed description is omitted.

As shown in FIG. 8, battery pack 1b of this exemplary embodiment includes a pair of film-packaged battery assemblies 2a and 2b. Film-packaged battery assemblies 2a and 2b are arranged with fixing member 3 held therebetween.

Film-packaged batteries 10 of film-packaged battery assembly 2b (one of the film-packaged battery assemblies) are arranged shifted upward in the laminated direction relative to film-packaged batteries 10 of film-packaged battery assembly 2a (the other film-packaged battery assembly). Although, in the present embodiment, sealing part 15 terminates within the interior of slit 4, sealing part 15 may be bonded to the interior of slit 4 and outer side 3a of fixing member 3, as shown in FIG. 2.

Substrate 5 is bonded by bonding component 16a to the bottom surface of film-packaged battery assembly 2b and the top surface of film-packaged battery 2a. Thickness t of substrate 5 equals the amount of shift between the film-packaged batteries in film-packaged battery assemblies 2a and 2b. With this arrangement, it is possible to make the heights of film-packaged battery assemblies 2a and 2b meet. Further, substrate 5 includes protection circuit 6 to suspend charging and discharging of each power generation element 11.

As described above, according to battery pack 1b of the present exemplary embodiment, it is possible to align the height of the battery by using substrates 5 even when film-packaged battery assemblies 2a and 2b are arranged shifted in the laminated direction. Further, since substrate 5 includes protection circuit 6, it is possible to use space efficiently.

Substrate 5 is one example of a supplementary component for aligning the heights of film-packaged battery assemblies 2a and 2b. A component other than substrate 5 may be arranged. Protection circuit 6 may be provided separately from substrate 5 as in this embodiment, or substrate 5 itself may be configured to serve as a protection circuit.

Exemplary Embodiment 4

Figure 9:
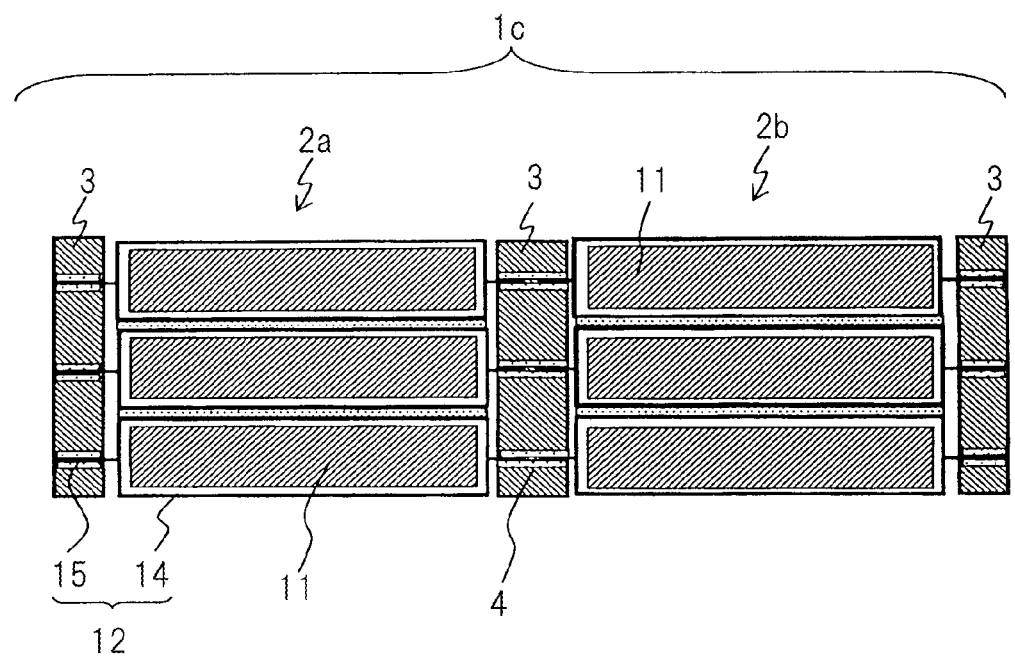
FIG. 9 is a sectional view showing the structure of a battery pack of exemplary embodiment 4.

Exemplary embodiment 4 of the present invention will be described. Description herein will be focused on the difference from exemplary embodiments 1 to 3. FIG. 9 is a sectional view showing the structure of the battery pack of exemplary embodiment 4. The same components as those of the above-described battery packs 1, 1a and 1b are allotted the same reference numerals, and detailed description is omitted.

As shown in FIG. 9, battery pack 1c of this exemplary embodiment includes a pair of film-packaged battery assemblies 2a and 2b just like aforementioned battery pack 1b. In battery pack 1b of exemplary embodiment 3, a plurality of sealing parts 15 are bonded to individual slits 4 in fixing member 3 arranged between film-packaged battery assemblies 2a and 2b.

On the other hand, battery pack 1c of this exemplary embodiment includes fixing member 3 arranged between film-packaged battery assembly 2a and film-packaged battery assembly 2b. In this fixing member 3, the sealing parts that face each other are bonded to the same slit 4. Accordingly, it is possible to align the heights of film-packaged battery assemblies 2a and 2b without using substrates 5 as in battery pack 1b of exemplary 3. Further, in battery pack 1c of this exemplary embodiment, power generation elements 11 are not shifted in the laminated direction between film-packaged battery assembly 2a and film-packaged battery assembly 2b. This arrangement makes it possible to further reduce the thickness of the entire battery compared to battery pack 1b of exemplary embodiment 3.

Although the present invention has been explained with reference to the exemplary embodiments, the present invention should not be limited to the above exemplary embodiments. Various modifications that can be understood by those skilled in the art may be made to the structures and details of the present invention within the scope of the present invention.

This application claims priority based on Japanese Patent Application No. 2013-53389, filed on Mar. 15, 2013, and incorporates all the disclosure thereof herein.

DESCRIPTION OF REFERENCE NUMERALS 1, 1a, 1b, 1c battery pack
2, 2a, 2b film-packaged battery assembly
3 fixing member
3a outer surface
4 slit
5 substrate
6 protection circuit
7 cathode
8 separator
9 anode
10 film-packaged battery
11 power generation element
12 film-wrapping
13 interior space
14 casing part
15 sealing part
16a, 16b, 16c bonding material
17 cathode lead terminal
18 anode lead terminal
21 resin layer
22 metal layer
23 resin layer
100 battery pack
101 cell case
102 conduit
103 rod
104 end

The invention claimed is:

1. A battery pack comprising;
a film-packaged battery assembly of a plurality of film-packaged batteries laminated, each film-packaged battery including a power generation element in which cathodes and anodes are laminated alternately with separators interposed therebetween and an internal space that is formed by film-wrapping material and that is capable of housing the power generation element along with an electrolyte;
a pair of fixing members that are arranged with the side face of the film-packaged battery assembly, wherein:
that pair of fixing members includes as many slits as there are film-packaged batteries;
the film wrapping includes a casing part that forms the interior space and a sealing part that extends from the casing part to the fixing member to seal the interior space; and
each sealing part of the film-packaged battery is inserted in the slit and is fixed therein to the pair of fixing members.

2. The battery pack according to claim 1, wherein a plurality of the slits are arrayed parallel to each other in the laminated direction.

3. The battery pack according to claim 1, wherein the portion of the sealing part projected beyond the slit is bonded to the outer surface of the fixing member where the opening of the slit is formed.

4. The battery pack according to claim 1, wherein the sealing part terminates in the interior of the slit and is bonded therein.

5. The battery pack according to claim 1, wherein the sealing part is bonded to both the outer surface of the fixing member where the opening of the slit is formed and to the interior of the slit.

6. The battery pack according to claim 1, wherein
a pair of the film-packaged battery assemblies are arranged with the fixing member interposed therebetween, the film-packaged batteries of one of the film-packaged battery assemblies being arranged to shift upward in the laminated direction relative to the film-packaged batteries of the other film-packaged battery assembly;
a supplementary component having a thickness measured in the laminated direction, equal to the amount of shift between the film-packaged batteries is disposed under the bottom of one of the film-packaged battery assemblies and above the top of the other film-packaged battery assembly;
the pair of fixing members are arranged with the side face of the pair of the film-packaged battery assemblies interposed therebetween;
the fixing member that is interposed between the pair of the film-packaged battery assemblies includes as many slits as there are film-packaged batteries for the pair of the film-packaged battery assemblies; and each sealing part of the film-packaged battery is inserted in the slit of the fixing member that is interposed between the pair of the film-packaged battery assemblies.

7. The battery pack according to claim 6, wherein the supplementary component includes a protection circuit for suspending charging and discharging of the power generation elements.

8. The battery pack according to claim 4, further including a pair of the film-packaged battery assemblies arranged with the fixing member interposed therebetween, and the film-packaged battery assemblies are arranged so that the sealing parts that face each other are inserted into the same slit.

9. The battery pack according to claim 1, wherein the material of the fixing member is formed of polyurethane resin or urethane rubber or polycarbonate or ABS resin.

* * * * *